G. W. KONE.
MEAT SLICING MACHINE.
APPLICATION FILED DEC. 18, 1911.
1,065,052.
Patented June 17, 1913.
5 SHEETS—SHEET 4.
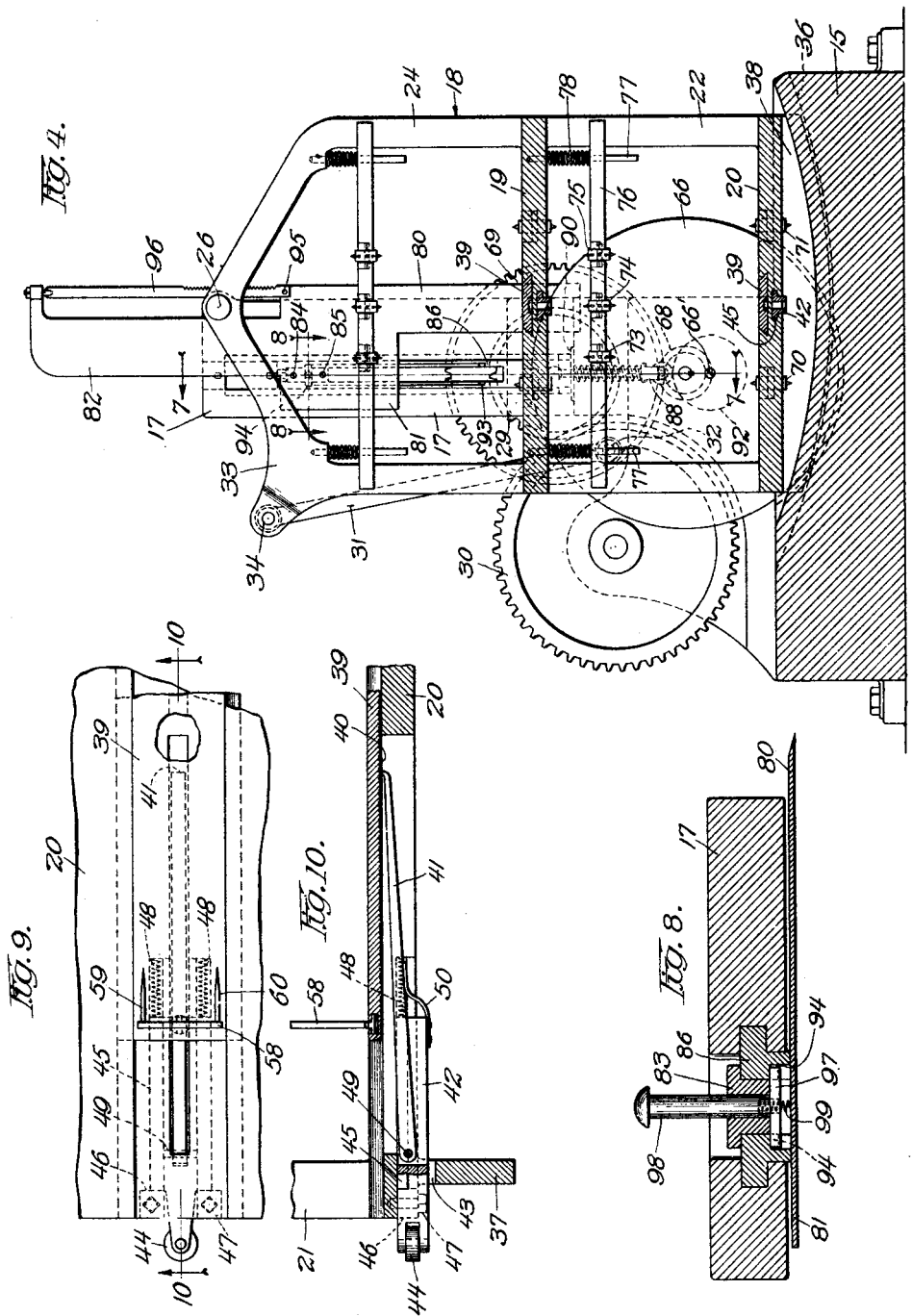

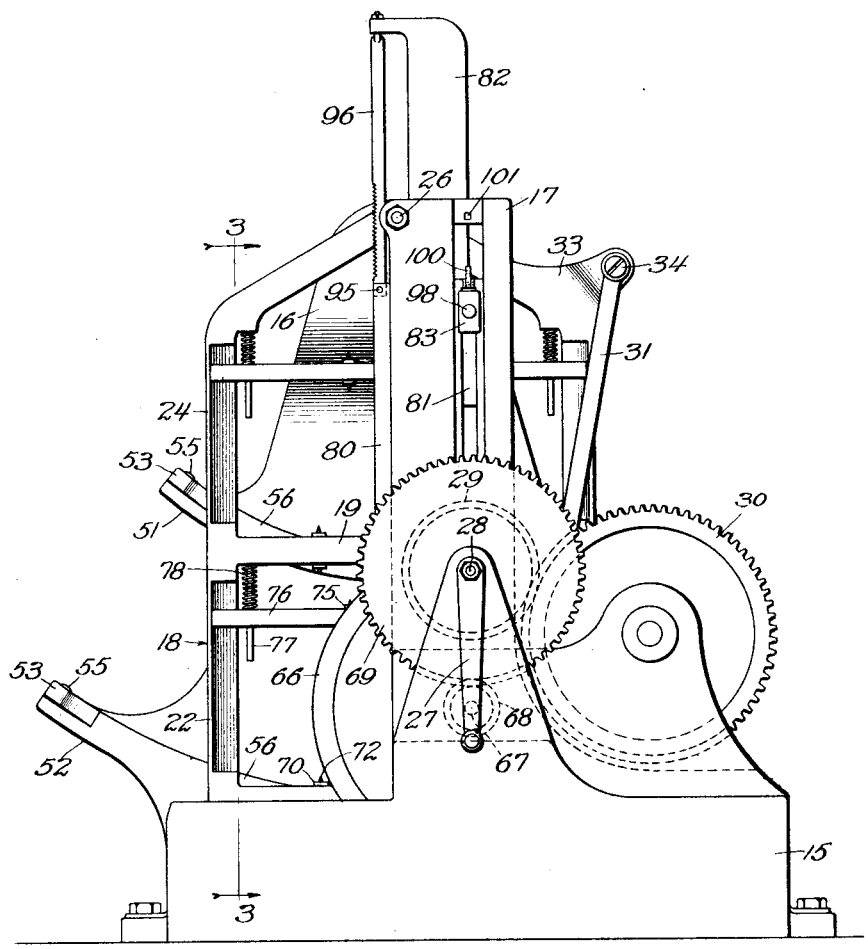

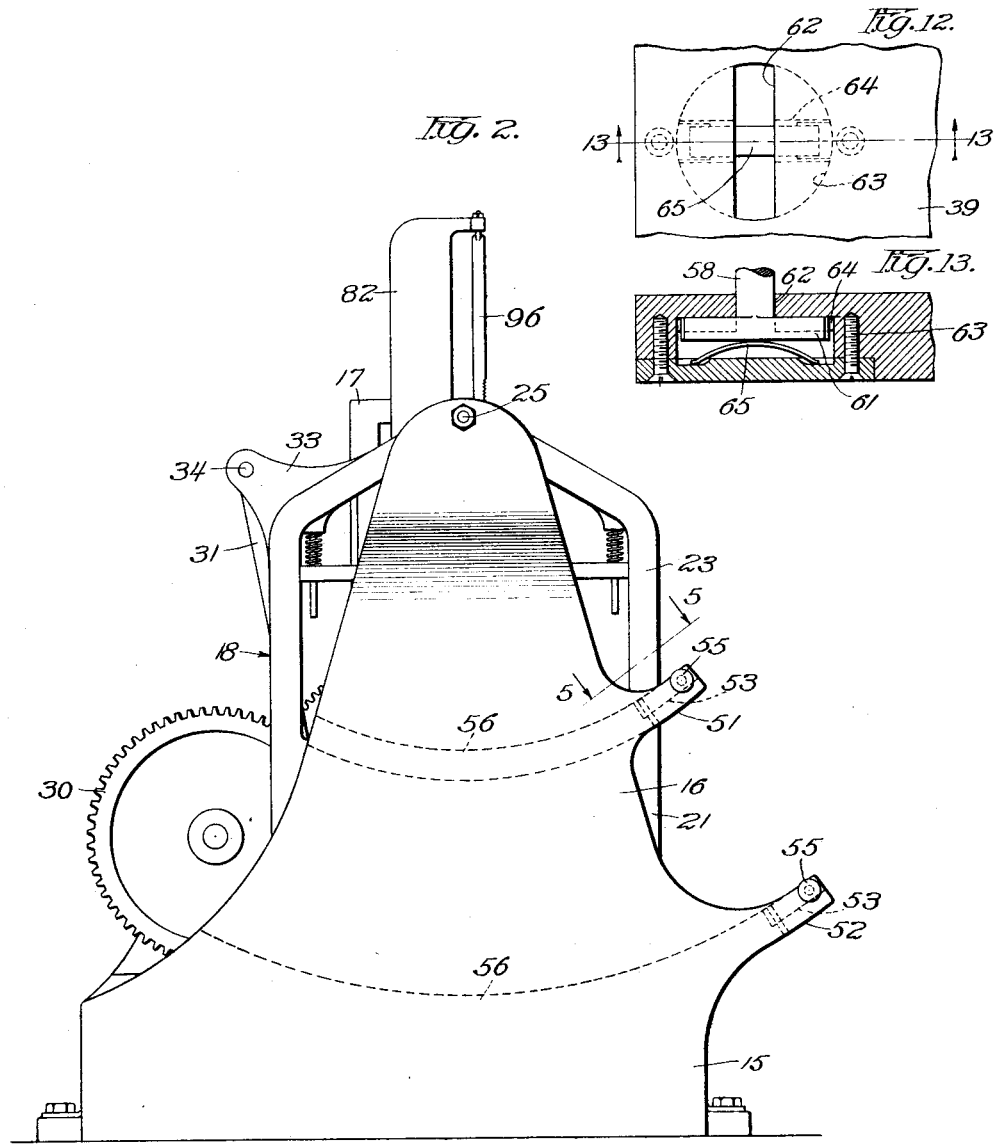

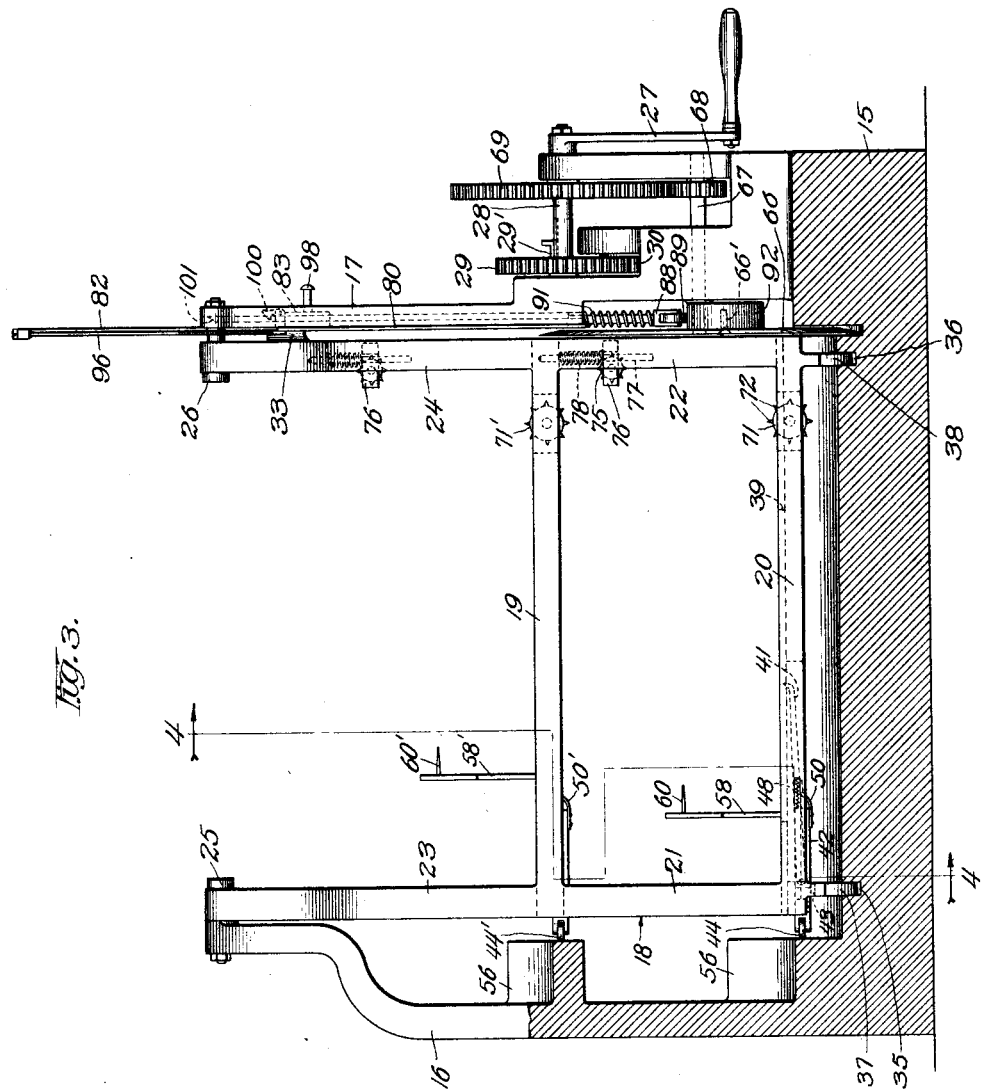

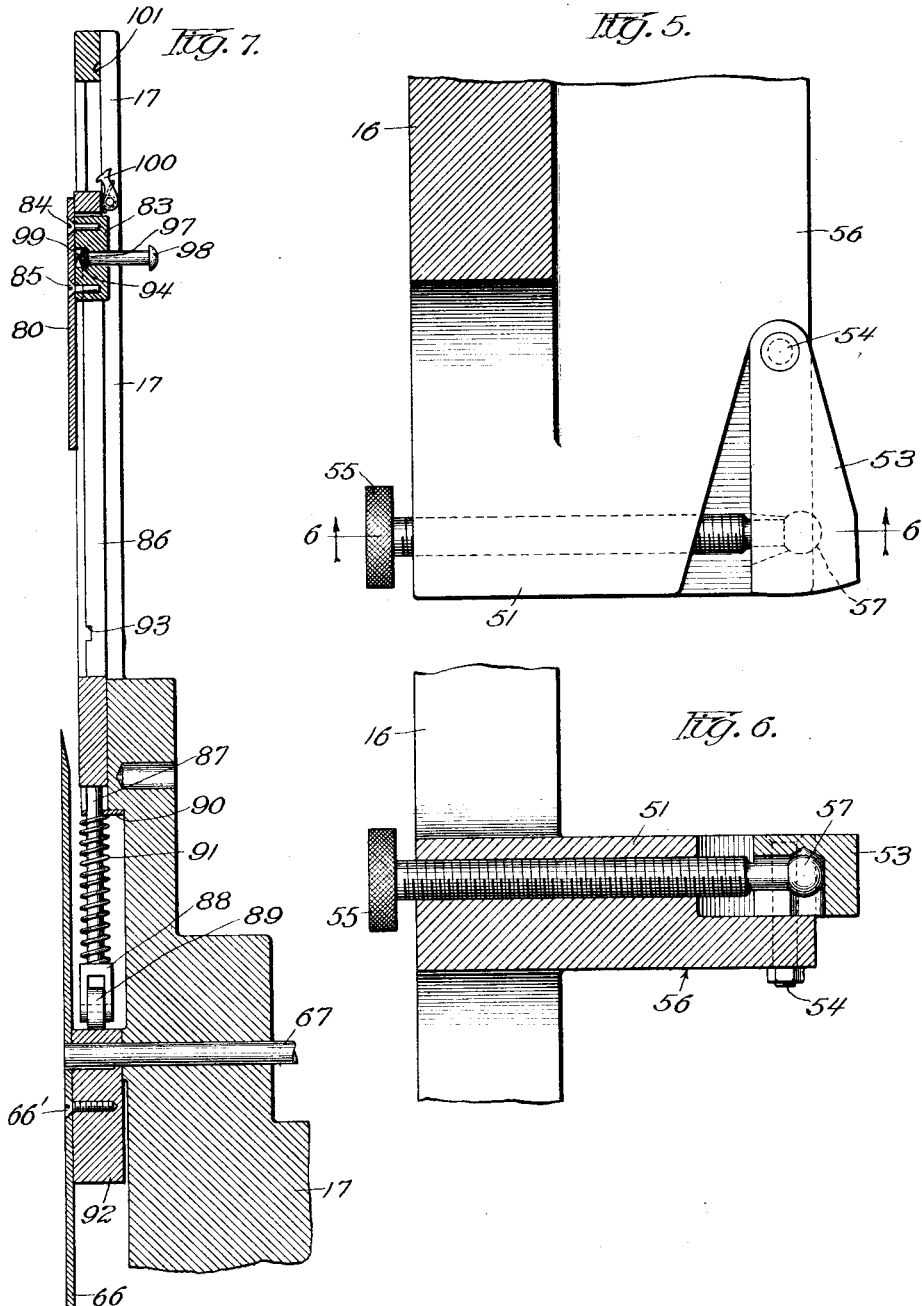

UNITED STATES PATENT OFFICE.

GEORGE W. KONE, OF ROCK ISLAND, ILLINOIS, ASSIGNOR OF ONE-FOURTH TO WILLIAM M. OHLWEILER, OF ROCK ISLAND, ILLINOIS.

MEAT-SLICING MACHINE.

1,065,052.  Specification of Letters Patent.  Patented June 17, 1913.

Application filed December 18, 1911. Serial No. 666,325.

*To all whom it may concern:*

Be it known that I, GEORGE W. KONE, a citizen of the United States, residing at Rock Island, in the county of Rock Island and State of Illinois, have invented certain new and useful Improvements in Meat-Slicing Machines, of which the following is a specification.

My invention relates to improvements in meat slicing machines, and has for one of its objects to provide a machine adapted for either manual or power operation, and one that is capable of slicing either green or cured meat, and coöperating rotating and reciprocating knives, and a saw adapted and arranged to saw the bone in substantially the same plane in which the meat is sliced.

Other and further objects of my invention will become readily apparent from a consideration of the following specification taken in conjunction with the drawings, wherein—

Figure 1 is an end elevation of the machine; Fig. 2 is a similar view looking at the opposite end; Fig. 3 is a longitudinal section taken on line 3—3 of Fig. 1; Fig. 4 is a section taken on line 4—4 of Fig. 3; Fig. 5 is an enlarged section taken on line 5—5 of Fig. 2, showing an adjustable feed cam; Fig. 6 is a transverse section taken on line 6—6 of Fig. 5; Fig. 7 is an enlarged section taken on line 7—7 of Fig. 4; Fig. 8 is an enlarged section taken on line 8—8 of Fig. 4; Fig. 9 is an enlarged plan view of a broken-away portion of the base or platform of the swinging meat carriage, showing the meat feeding mechanism; Fig. 10 is a longitudinal sectional view taken on line 10—10 of Fig. 9; Fig. 11 is a detail showing a meat steadying device; Fig. 12 is an enlarged broken-away plan view of the meat-engaging standard bearing pins of the feeding device; and Fig. 13 is a transverse section of the same taken on line 13—13 of Fig. 12.

In all of the views, the same reference characters indicate similar parts.

In the exemplification shown for the purpose of disclosing my invention, 15 is a base portion of a stationary frame, provided with end standards 16 and 17. An oscillatable or swinging meat-carrying frame 18 is provided with floors or platforms 19 and 20, joined at their ends by end members 21 and 22. Vertical standards 23 and 24 rise above the floor 19 and are hinged to the standards 16 and 17 as at 25 and 26; so that the frame may be freely swung to and fro or oscillated upon said hinged support. The meat-carrying frame 18 is oscillated on its supports by means of a train of gears comprising a handle 27, a shaft 28, gear wheels 29 and 30. A connecting rod 31 is connected to a crank pin 32 on the wheel 30, and at its upper end is connected to an arm 33 on the frame 18 as at 34, so that when the wheel 30 is rotated, the frame 18 is given an oscillating or swinging motion. Guideways 35 and 36 are provided by grooves cut into the base 15, and ribs 37 and 38 project from the frame into the guide-ways 35 and 36 respectively and prevent lateral longitudinal motion of said oscillating frame.

The floors or platforms 19 and 20 of the meat-carrying frame 18 are similar in every respect and are provided with similar mechanisms for feeding the meat toward the cutting knives. The meat to be carried on the floor 20 is such that it may best be cut by the rotary knife, such as dried beef and the like, which is devoid of bone, while the platform 19 is best adapted for green meat or smoked meat containing bone, such as fresh beef, smoked ham, or the like.

In describing the meat-feeding apparatus associated with platform 19, I will indicate the parts thereof by the same reference characters that I have used in describing the same mechanism and parts in association with platform 20, with the addition of the exponent prime (').

Cut into the upper surface of the platform 20 and the full length thereof is a dovetailed groove for the accommodation of a slide 39, said slide being adapted to be moved longitudinally of the frame freely within the groove. On the under surface of the slide there are a series of ratchet teeth 40, that are adapted to be engaged by a feed dog 41. A slidable member 42 is freely movable in the slot 43 made in the base 20 and through the rib 37. Secured to the member 42 is a spring 50 which bears against the under side of the dog 41 and holds it normally in contact with the ratchet teeth 40 on the member 39.

Projecting from the side frame 16 are two arms 51 and 52, portions of which are more clearly shown in Figs. 5 and 6. These arms carry a feed cam 53, which is hinged as at 54 and is outwardly adjustable by means of a screw 55.

In the swinging operation of the frame 18 the roller 44 rides up over the cam 53 which pushes the sliding member 42 inwardly and therewith the dog 41, and thereby moves the sliding meat-moving part 39 toward the cutting knives. On the return movement of the oscillating frame, and when the roller 44 leaves the cam 53, the spring 48 moves the sliding member 42 to its normal position against the stop 46. This operation feeds the meat forward at each stroke proportional to the position of the cam 53, with reference to the flange or rib 56 over which the roller 44 moves.

It will be readily understood that the relatively outward and inward movement of the cam 53, by means of the screw 55, adjusts the feed device to vary the thickness of the slices of meat to be cut from the stock that rests upon the platform 19 or 20, as the case may be.

Rising from the slide 39 is a standard 58 provided with laterally extending prongs 59 and 60, which enter the meat and hold it so as to prevent lateral displacement.

The front end of the slide 39 can extend only up to the vertical plane in which the cutting knives are located, and, therefore, after the meat to be sliced has been reduced to a given size, it becomes necessary to place the meat, with respect to the ends of slide 39, so that it may be sliced without interference by the slides. I therefore provide two perforations in the slide 39, one near each end thereof, for the standards 58, so that the standards 58 may be primarily placed near the left hand end and subsequently near the right hand end of the slide 39, and continue to feed the meat forwardly as before.

In Figs. 12 and 13 I have shown enlarged detailed views of the manner of attaching the standards, 58, in the slide 39. To the bottom of the standard 58 is secured a cross bar 61 and a slot 62 is made in the slide 39 which is sufficiently wide for admission of the cross bar 61. A round hole 63 is bored into the slide 39 of sufficient diameter to admit the cross bar 61. A slot 64 is made part way through the slide 39 and between the hole 63 in the upper portion of the slide 39 into which the cross bar is forced by means of the spring 65. Now, to remove the standard 58 it is only necessary to depress it until the cross bar 61 leaves the slot 64 and then by a quarter turn it may be lifted out of the slot 62. Both ends of the slide 39 are provided with this means of inserting the standard 58, so that after a large piece of meat has been cut with the standard 58 at the left hand end of the slide 39, it may be moved to the right hand end of the slide 39 and inserted in that end in the manner described and the slicing operation completed.

A rotary knife 66 is secured to a shaft 67 which has bearing in the standard 17. A pinion 68 is carried on the shaft 67 and meshes with a gear wheel 69 that is carried on the primary shaft 28, so that when the primary shaft 28 is rotated the knife 66 is rotated at a relatively high speed.

Rollers 70 and 71 are provided with spikes or points 72 and project above the base 20 for engagement with the meat as it is fed forward to prevent lateral displacement thereof. Similar rollers 73, 74, and 75 are provided on a cross bar 76 which is vertically movable on guide rods 77 and yieldingly maintained in their depressed position by springs 78. These rollers engage the upper surface of the meat and prevent its rolling motion or its lateral displacement when the same is engaged by the knife.

Now, when the meat is placed on the platform 20 and against the standards 58 and the handle 27 is turned, the frame 18 is given an oscillating motion so as to carry the meat beyond the confronting front cutting edge of the rotary knife 66. As the swinging frame moves through the last portion of its outward excursion the roller 44 encounters the cam 53 and thereby the sliding member 42 is moved inwardly causing the dog 41 that engages the teeth 40 on the slide 39 to move the meat toward the knives proportionately as the cam 53 is adjusted outwardly from the rib 56, thereby moving a portion of the meat beyond the cutting edge of the knife and thus regulating the thickness of the slice. Now when the handle is further turned the oscillating meat-carrying frame 18 is moved toward the knife by means of the gear wheels 30 and the connecting rod 31 at the same time that the knife 66 is rotated at high speed, and by this means the meat is sliced into pieces of any desired thickness. A rotary knife, however, is not so well designed for cutting green or fresh meat, or meat carrying bones, and I have, therefore provided another means by which meat of this character may be readily sliced: A knife 80 extends rearwardly of its cutting edge as at 81 and upwardly as at 82. It is connected to a slidable member 83 as by screws 84 and 85. The said member 83 to which the knife 80 is attached is capable of being slid freely in a vertical moving member 86, in a longitudinal slot provided therein. To the lower end of the member 86 is attached a vertical rod 87 and fixed to the lower end of this rod is a frame 88 which carries a roller 89. The rod 87 passes through a perforated abutment or guide 90 provided on the standard 17. The sliding member 86 is also guided in a slot provided in the standard 17. Between the guiding abutment 90 and the frame 88 is an open helical compression spring 91 which tends to yieldingly hold the roller 89 and sliding member 86 in a downward position. The roller 89 rests upon a cam 92 which latter is secured to the saw 66 as by a screw 66' and to the rotating shaft 28, so that when the shaft 28 is rotated the member 86 is given a vertical movement by the operation of the cam. There are two separated notches made in the member 86, as at 93 and 94. To the upper edge of the cutting portion of the knife 80 as at 95 is secured a saw 96. The saw 96 moves with the knife 80 when it is vibrated in a vertical direction.

The saw and knife will not move in a vertical direction unless the cross bar 97, shown in Fig. 8, enters either of the notches 93 or 94. To the center of the cross bar 97 is secured a stem 90 which takes through the slidable member 83, and a spring 99 bearing against the surface of the knife 80 forces the member 98 and the cross bar 97 in an outward direction, so that when the cross bar is brought opposite to either of the notches 94 or 93 the spring 99 retains the cross bar therein, so that thereby the members 83 and 84 are caused to move together.

In Fig. 4 the cross bar 97 is shown in engagement with the upper notch 93 and the saw 96 is in its uppermost position, so that the knife 80 is in operative position to cut the meat that may be placed upon the platform 19. Now, after the meat has been cut by the knife 80 and a bone is encountered, it is only necessary to push the stem 98 inwardly toward the knife, against the spring 99, until the cross bar 97 is forced out of the slot 93 and then move the knife 80 and the saw 96 which is attached to the slidable lug 83, downwardly until the cross bar 97 engages the notch 94 in which position the saw will then be in the place formerly occupied by the knife 80 and ready to saw the bone, and after the bone has been sawed the knife 80 may be replaced in position ready for cutting by moving the cross bar 97 back into notch 93.

When it is desired to use the rotary saw only, the frame 86 may be raised until the wheel or roller 89 no longer encounters the cam 92 and said frame may be held in raised position by means of the dog 100 when it engages the notch 101.

When a bone is to be sawed, it is then, of course, no longer necessary to oscillate the frame 18 in preparing the meat, and the rod 31 may therefore be disconnected from the frame in any suitable manner, as by removing it from the crank pin 32 on the wheel 30, or if desired, the wheel 30 may be disconnected by moving it longitudinally of the shaft 28 until it no longer engages the key 29' by means of which it is rotatably fixed to the shaft 28.

While I have herein described a particular embodiment of my invention for the purpose of clear disclosure, it is evident that many changes may be made in the specific structure without departing from the scope of the appended claims.

What I claim is:

1. In a machine of the class described, a stationary frame, an oscillatable meat-carrying frame pivotally mounted therein, a movable knife mounted on the stationary frame, a train of gears, a pitman rod between said gears and said oscillatable frame, a cam movable with said train of gears, and a rod associated with said knife and abutting against said cam for movement of the knife by said train of gears.

2. In a machine of the character described, a stationary frame provided with a standard at each end, an oscillatable meat-carrying frame hinged to the upper ends of said standards, a knife located at one end of the stationary frame near the path of the oscillatable frame, means for supporting meat on the oscillatable frame, means for feeding the meat toward said knife, guiding means for said swinging frame, and means for operating said meat-carrying frame.

3. In a machine of the character described, a stationary frame, an oscillatable meat-carrying frame hinged thereto, means for feeding meat toward one end of said frame, a vertically reciprocable frame carrying a saw and a knife in vertical alinement, and means for vertically moving and securing said saw and knife with respect to said frame to bring either the knife or the saw into cutting position with respect to the meat-carrying part.

4. In a machine of the character described, a stationary frame, a reciprocable knife, and a saw in vertical alinement, a reciprocable frame guided in said stationary frame for reciprocating said knife and saw, means for longitudinally moving said knife and saw with respect to said reciprocable frame and securing same thereto at selected points to place either the knife or the saw in operative position with respect to a meat-carrying frame, and a meat-carrying frame for moving meat across the path of said knife or saw.

5. In a machine of the class described, a stationary frame, a meat-carrying frame hinged thereto, a reciprocable frame guided in said stationary frame, a knife and a saw in the same longitudinal plane carried by said reciprocable frame, means for moving said knife and saw to and securing same at selected positions on said frame, means for oscillating said meat-carrying frame for cooperation with said knife, means for disconnecting said frame. oscillatable means for coöperation with said saw, and for reciprocating said knife and saw-carrying means.

6. In a device of the class described, a stationary frame, a frame pivotally mounted therein, a knife, a saw, a train of gears, and connections between said gears and the pivotally mounted frame, knife, and saw, for operation of said parts.

7. In a device of the class described, a stationary frame, a frame pivotally mounted therein, a knife mounted for oscillation, a saw mounted for oscillation, said knife and saw being movable bodily to a position for coöperation with said pivotally mounted frame, and means to oscillate the frame and the knife or saw.

8. In a device of the class described, a stationary frame, a frame pivotally mounted therein, a knife movable to a position for coöperation with said pivotally mounted frame to cut meat thereon and removable from such position, a saw movable to the position normally occupied by said knife for operation to saw a bone in the meat on said pivotally mounted frame, and means to oscillate said frame and operate the knife or the saw according to which is in position for coöperation with said pivotally mounted frame.

In testimony whereof I hereunto set my hand in the presence of two witnesses.

GEORGE W. KONE.

In the presence of—
  B. D. LAMONT,
  WILLIAM M. OHLWEILER.

---

Copies of this patent may be obtained for five cents each, by addressing the "Commissioner of Patents, Washington, D. C."